(12) United States Patent
Baljekar et al.

(10) Patent No.: US 11,156,381 B2
(45) Date of Patent: Oct. 26, 2021

(54) MOTOR MOUNT FOR HVAC SYSTEM

(71) Applicant: Johnson Controls Technology Company, Auburn Hills, MI (US)

(72) Inventors: Akshay S. Baljekar, Pune (IN); Sourabh Nema, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 204 days.

(21) Appl. No.: 16/592,147

(22) Filed: Oct. 3, 2019

(65) Prior Publication Data

US 2021/0102729 A1    Apr. 8, 2021

(51) Int. Cl.
*F16M 1/00*        (2006.01)
*F24F 13/32*       (2006.01)
*F04D 29/60*       (2006.01)
*F16M 13/02*       (2006.01)

(52) U.S. Cl.
CPC .............. *F24F 13/32* (2013.01); *F04D 29/60* (2013.01); *F16M 13/02* (2013.01)

(58) Field of Classification Search
CPC .... F04D 29/444; F04D 29/667; F04D 29/681; F04D 29/668; F24F 1/221; F24F 1/0323; F24F 13/32; F16M 1/04; F02K 5/00; B60H 1/00521
USPC ......... 248/670, 346.01, 346.03, 346.06, 604; 417/360, 363; 165/69, 122; 62/297
See application file for complete search history.

(56) References Cited

U.S. PATENT DOCUMENTS

| | | | | |
|---|---|---|---|---|
| 3,093,189 A | * | 6/1963 | Panthofer | F01P 5/02 165/69 |
| 4,155,529 A | * | 5/1979 | Maudlin | B60H 1/00521 248/604 |
| 4,191,245 A | * | 3/1980 | Wendt | H02K 5/00 165/69 |
| 5,069,415 A | * | 12/1991 | Mechalas | H02K 5/26 248/674 |
| 5,492,456 A | * | 2/1996 | Knight | F04D 29/626 248/604 |
| 2021/0071905 A1 | * | 3/2021 | Salunkhe | F24F 13/32 |

FOREIGN PATENT DOCUMENTS

| | | |
|---|---|---|
| CN | 105864070 A | 8/2016 |
| CN | 205569016 U | 9/2016 |
| GB | 944878 A | 12/1963 |
| WO | 2012143580 A1 | 10/2012 |

* cited by examiner

*Primary Examiner* — Todd M Epps
(74) *Attorney, Agent, or Firm* — Fletcher Yoder, P.C.

(57) ABSTRACT

An adjustable mount for a fan assembly includes a plurality of adjustable supports configured to mount the fan assembly to a heating, ventilation, and/or air conditioning (HVAC) unit. Each adjustable support of the plurality of adjustable supports includes a first frame member, a second frame member, and a third frame member. The first and second frame members are adjustable relative to one another along a first axis, and the second and third frame members are adjustable relative to one another along a second axis crosswise to the first axis.

30 Claims, 10 Drawing Sheets

MOTOR MOUNT FOR HVAC SYSTEM

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be noted that these statements are to be read in this light, and not as admissions of prior art.

HVAC systems are utilized in residential, commercial, and industrial environments to control environmental properties, such as temperature and humidity, for occupants of the respective environments. An HVAC system may control the environmental properties through control of an air flow delivered to the environment. For example, the HVAC system may circulate a refrigerant and place the refrigerant in a heat exchange relationship with a supply air flow to condition the supply air flow before it is discharged to the conditioned environment. The HVAC system may also place the refrigerant in a heat exchange relationship with an ambient air flow in order to facilitate cooling of the refrigerant. To this end, the HVAC system may include a fan configured to direct the ambient air flow across a heat exchanger coil flowing the refrigerant in order to cool the refrigerant. The fan may be operated by a fan motor, and the fan motor may be securely coupled within the HVAC system via a motor mount. In some embodiments, the motor mount may be configured to couple to mounting points of the HVAC system that are arranged in a particular orientation. Additionally, the motor mount may be configured to receive a particularly sized fan motor. As a result, the motor mount may be suitable for use with some HVAC systems and fan motors but not others. As such, various embodiments of the motor mount may be manufactured, and each embodiment is configured to couple to mounting points arranged in a certain orientation and/or to accommodate a fan motor of a certain size, thereby increasing a cost associated with installation of fan motors in the HVAC system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an adjustable mount for a fan assembly includes a plurality of adjustable supports configured to mount the fan assembly to a heating, ventilation, and/or air conditioning (HVAC) unit. Each adjustable support of the plurality of adjustable supports includes a first frame member, a second frame member, and a third frame member. The first and second frame members are adjustable relative to one another along a first axis, and the second and third frame members are adjustable relative to one another along a second axis crosswise to the first axis.

In one embodiment, an adjustable mount for a fan assembly includes a plurality of first frame members disposed about a center axis, a plurality of second frame members, and a plurality of third frame members. Each second frame member of the plurality of second frame members is adjustably coupled to a respective first frame member of the plurality of first frame members, and the plurality of first frame members and the plurality of second frame members respectively coupled together are adjustable relative to one another along a respective first axis. Further, each third frame member of the plurality of third frame members is adjustably coupled to a respective second frame member of the plurality of second frame members, and the plurality of second frame members and the plurality of third frame members respectively coupled together are adjustable relative to one another along a second axis crosswise to each first axis.

In one embodiment, a heating, ventilation, and/or air conditioning (HVAC) system includes a structural support having a fan orifice and a plurality of mounting legs positioned about a central axis of the fan orifice to form a receptacle configured to receive a fan motor therein. Each mounting leg of the plurality of mounting legs includes a first frame member configured to couple to the structural support, a second frame member coupled to the first frame member, and a third frame member coupled to the second frame member. The first frame member and the second frame member are configured to translate relative to one another along a respective first axis, and the second frame member and the third frame member are configured to translate relative to one another along a second axis crosswise to each first axis.

In one embodiment, an adjustable mount for an HVAC fan assembly includes a plurality of adjustable supports configured to suspend the HVAC fan assembly from a base. Each adjustable support includes three frame members and is adjustable in two mechanical degrees of freedom.

DRAWINGS

Various aspects of this disclosure may be better understood upon reading the following detailed description and upon reference to the drawings in which.

DETAILED DESCRIPTION

Figure 1:
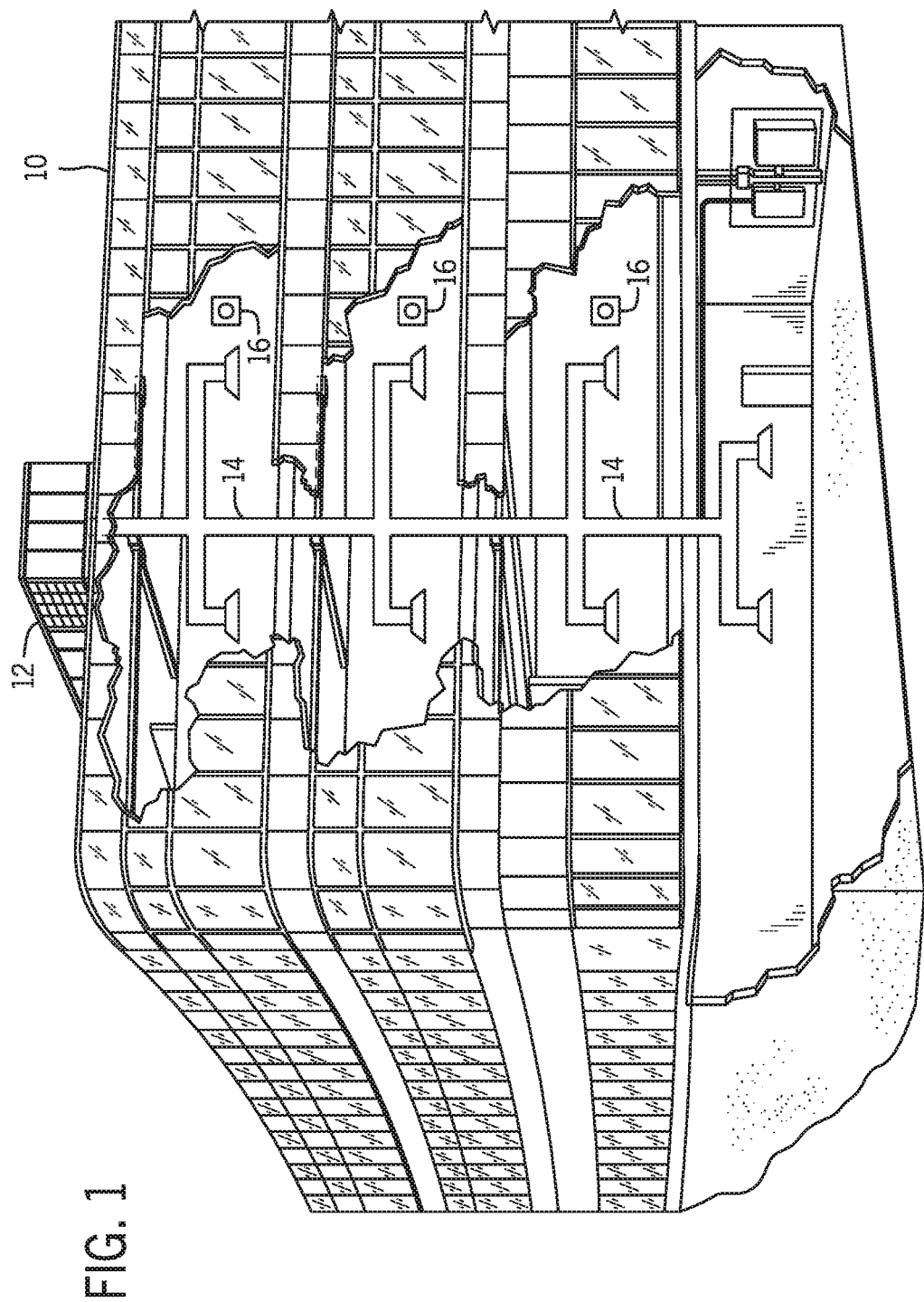
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system that includes a fan. In some embodiments, the fan may draw or force air across a heat exchanger of the HVAC system, such as to cool a refrigerant flowing through the heat exchanger or an air flow directed across the heat exchanger. The fan may be driven by a fan motor coupled to the HVAC system, such as by a motor mount that receives and secures the fan motor therein so as to secure the fan motor and fan to the HVAC system. For example, the motor mount may be secured to mounting points of a fan deck or housing of the HVAC system.

Different HVAC system may have respective sets of mounting points positioned at various orientations and/or may use differently-sized fan motors. For example, HVAC systems may use differently-sized fans and may have differently-sized fan orifices. As a result, the respective sets of the mounting points may be positioned differently to accommodate the differently-sized fan orifices. Additionally, HVAC systems may utilize different fan motors that have various dimensions or sizes, such as different diameters and/or lengths. However, traditional motor mounts may be configured to align with mounting points arranged in a particular orientation and not with mounting points arranged in a different orientation, and/or traditional motor mounts may be configured to receive and support a fan motor having a particular dimension but may not support fan motors of other dimensions. For this reason, different embodiments of motor mounts may be manufactured, and each motor mount embodiment may align with a specific orientation of mounting points and/or may receive and support a specifically-sized fan motor. Thus, a specific motor mount embodiment may be selected to accommodate the mounting points of a particular HVAC system and/or a specific fan motor to be used in the HVAC system. However, manufacturing various embodiments of motor mounts may increase a cost associated with installing fan motors to an HVAC system. For instance, if mounting points of the HVAC system are to be changed in orientation and/or if differently-sized fan motors are to be used, such as to support a differently-sized fan, an additional or different motor mount may be manufactured or sourced in order to accommodate the change in mountings points and/or fan motor. Thus, a cost associated with manufacturing and/or modifying the HVAC system may be increased.

Thus, it is now recognized that implementing a motor mount that is adjustable to align with mounting points of various orientations and adjustable to support fan motors of different sizes may reduce costs associated with manufacture of HVAC systems. In other words, a single embodiment of a motor mount may be adjustable and configured to align with different sets of mounting points arranged in various orientations and to receive and support fan motors of different sizes. As such, the single embodiment of the motor mount may be implemented into different HVAC systems. Accordingly, embodiments of the present disclosure are directed to a motor mount that includes a plurality of adjustable supports, each of which includes frame members that are adjustable to one another. For example, the adjustable supports may be moveable relative to one another to capture a fan motor of a particular diameter. Additionally, respective first frame members of each adjustable support may be moved relative to a corresponding second frame member of each adjustable support to align and couple with various mounting positions and/or to accommodate fan motors having different diameters or widths. Furthermore, respective third frame members of each adjustable support may be moved relative to the corresponding second frame member of each adjustable support to adjust to fan motors having various lengths or heights. Thus, a single motor mount embodiment may be manufactured to couple to HVAC systems having mounting points arranged in different orientations and to enable different fan motors to be installed to the HVAC system. Thus, costs associated with manufacturing and maintaining HVAC systems may be reduced.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
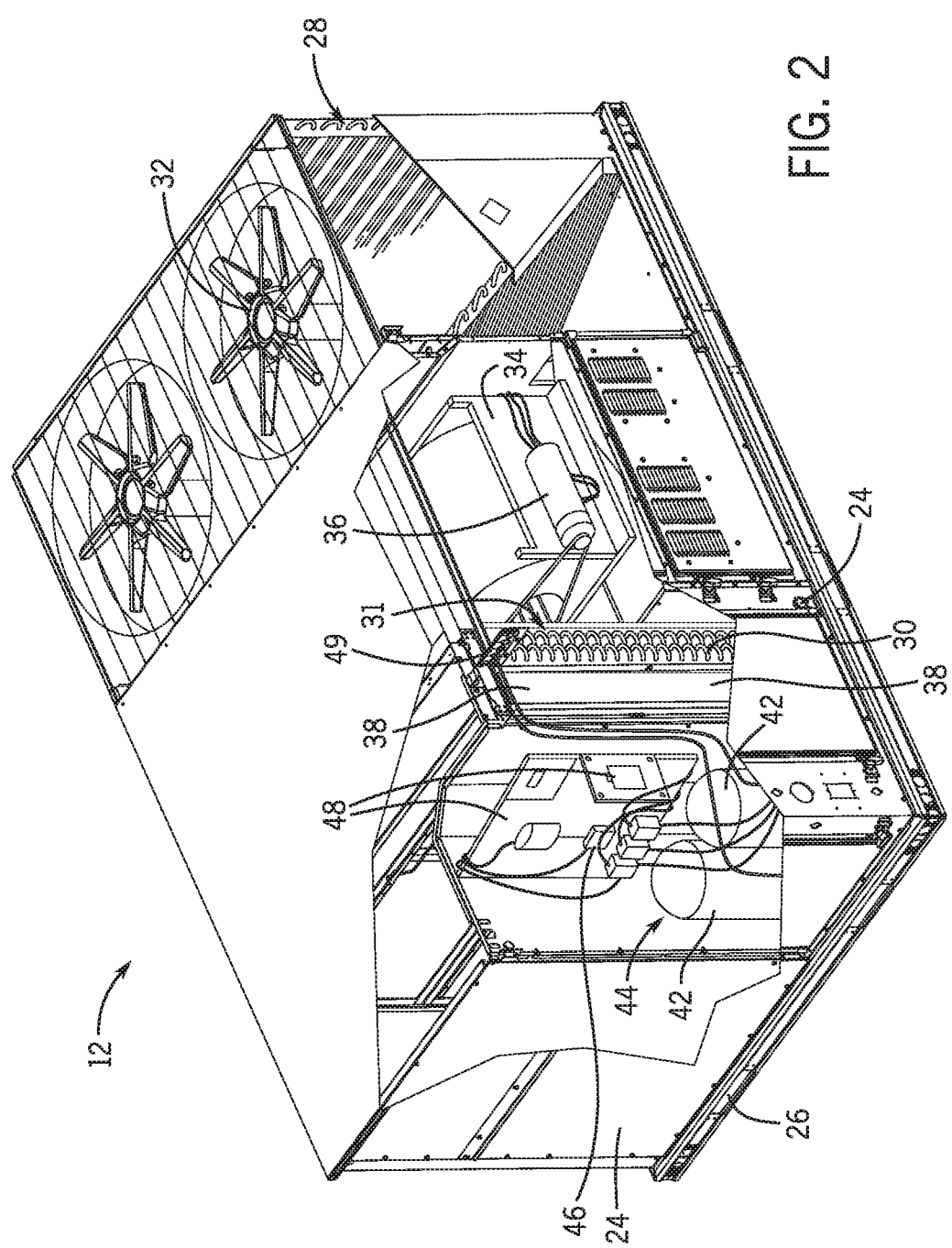
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be noted, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment.

The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
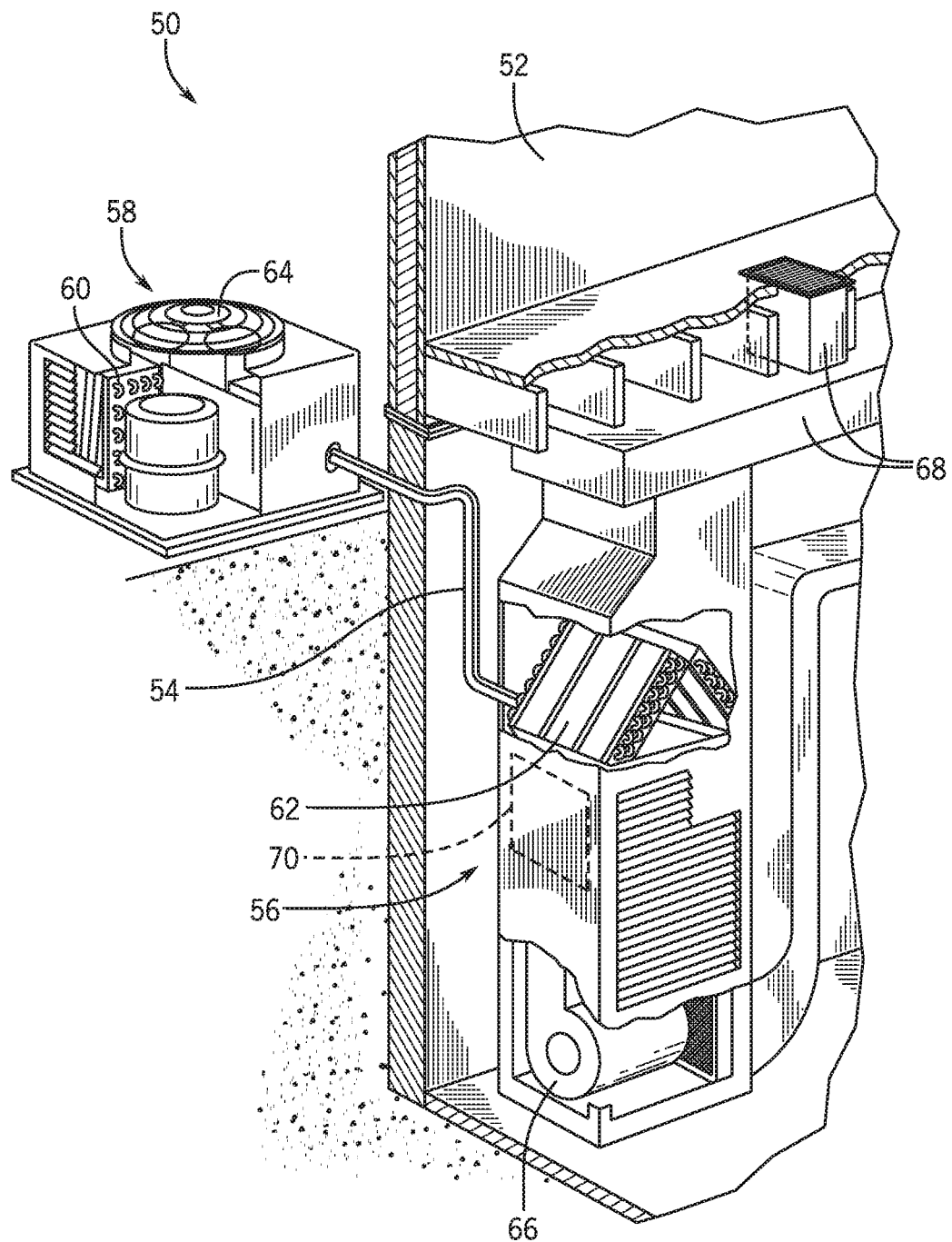
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
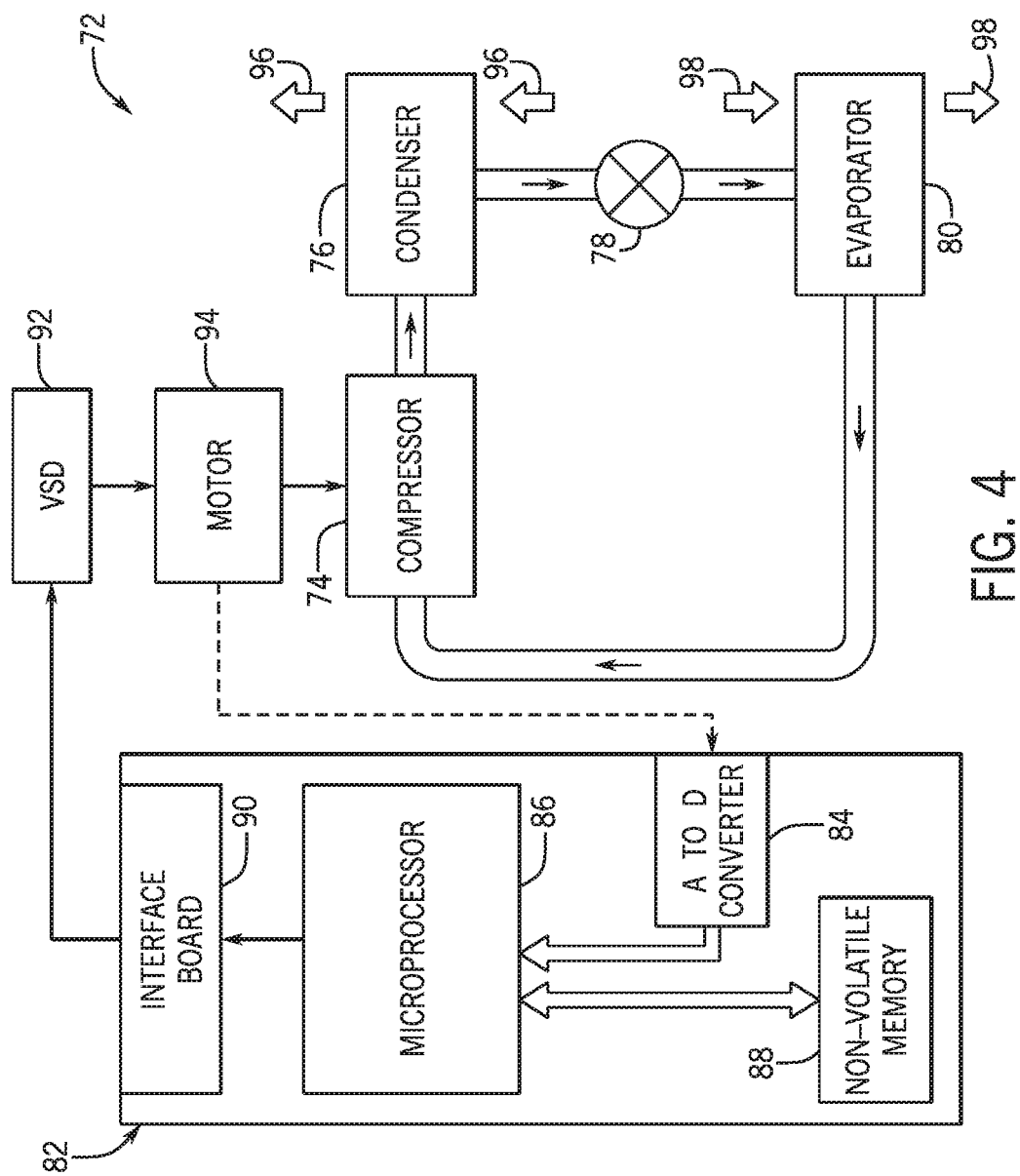
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be noted that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

An HVAC system, such as the HVAC unit 12 and/or the residential heating and cooling system 50, may include a fan configured to draw or force air across a component of the HVAC system, such as a heat exchanger of the HVAC system. For example, the fan may be utilized to cool a refrigerant and/or an air flow of the HVAC system. The fan may be driven by a motor that is received by an adjustable motor mount configured to secure the motor and a corresponding fan to the HVAC system. The motor mount may be configured to couple to a set of mounting points of the HVAC system, such as mounting points of a housing of the HVAC system. In some embodiments, the motor mount may include adjustable supports having frame members that are adjustable relative to one another. Each adjustable support may be positioned independently. For example, a first frame member of each adjustable support may be adjustable to couple to a corresponding mounting point of the HVAC system. A second frame member of each adjustable support may be configured to translate relative to the first frame member along a first axis to accommodate fan motors of different diameters or widths. Furthermore, a third frame member of each adjustable support may be configured to translate relative to the second frame member along a second axis transverse or crosswise to the first axis to accommodate fan motors of different lengths or heights. Thus, the motor mount may accommodate mounting points arranged in various orientations and/or fan motors of different sizes.

Figure 5:
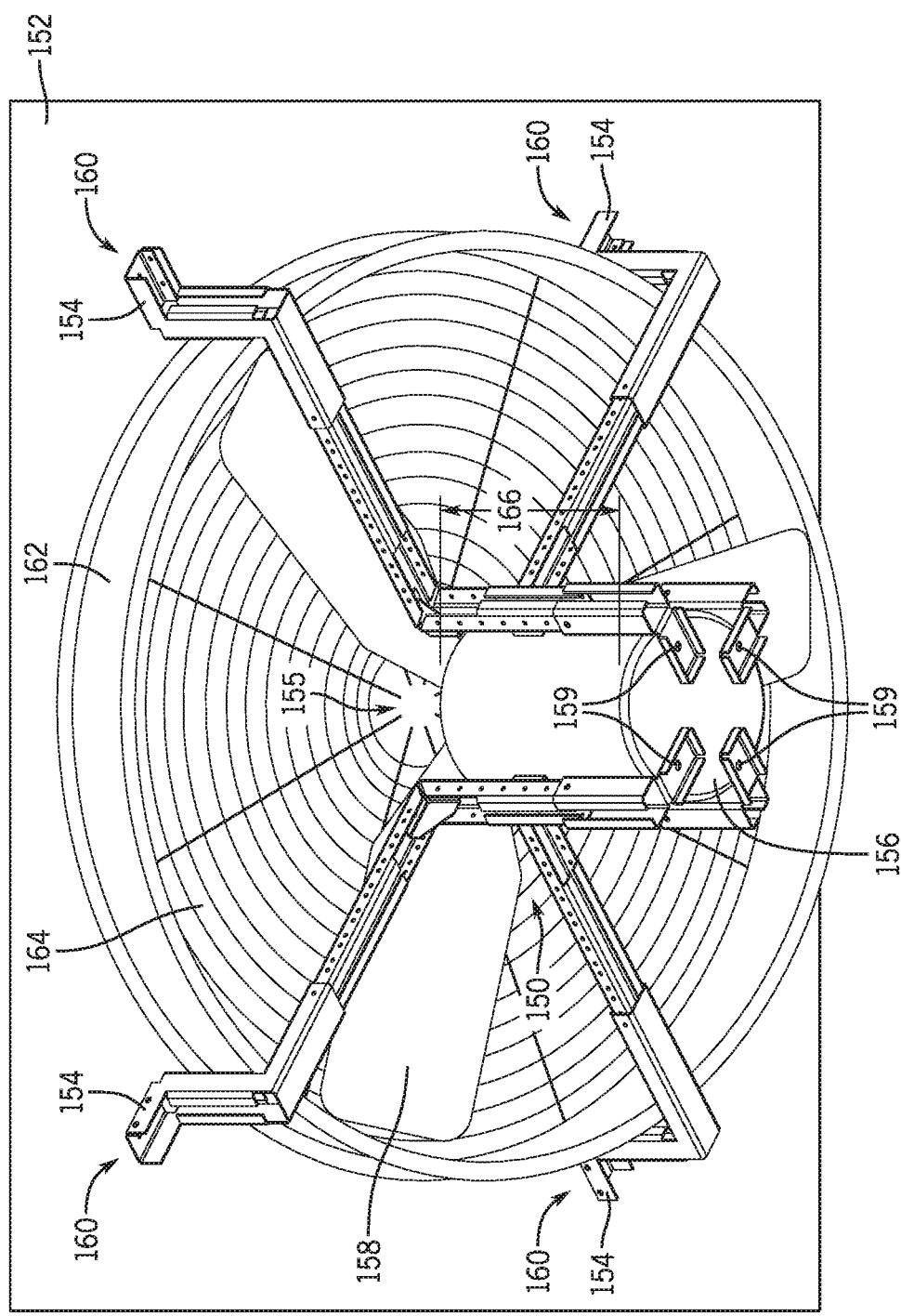
FIG. 5 is a perspective view of an embodiment of an adjustable mount configured to couple a fan motor to a structural support of an HVAC system, in accordance with an aspect of the present disclosure.

FIG. 5 is a perspective view of an embodiment of an adjustable mount 150 coupled to a structural support 152 of an HVAC system, such as the HVAC unit 12 or the residential heating and cooling system 50. The adjustable mount 150 may include a plurality of adjustable supports 154 configured to form a receptacle or space that receives a fan assembly 155 that includes a fan motor 156 and a fan 158. As an example, in an installed configuration of the adjustable mount 150, each adjustable support 154 may be configured to abut the fan motor 156 and capture the fan motor 156 within the receptacle. In addition, each adjustable support 154 may include a mounting feature, such as a hole 159, a prong, a recess, or other mount. The fan motor 156 may have corresponding holes or openings that may align with the holes 159 of the adjustable supports 154. Each hole 159 may be configured to receive a fastener to couple the adjustable support 154 to the fan motor 156, thereby restricting movement of the fan motor 156 relative to the adjustable mount 150. As such, the position of the fan motor 156 is secured within the receptacle.

Further, each adjustable support 154 is configured to couple to the structural support 152, such as to a respective mounting point 160 of the structural support 152. Thus, the adjustable support 154 couples the fan assembly 155 to the structural support 152 such that the fan assembly 155 is suspended from the structural support 152 in an installed configuration of the adjustable mount 150. Although there are four mounting points 160 and four corresponding adjustable supports 154 in the illustrated embodiment, in alternative embodiments, the structural support 152 may include any suitable number of mounting points 160, and there may be a corresponding number of adjustable supports 154 configured to couple to the mounting points 160. In some embodiments, the structural support 152 may include a fan orifice 162, and the mounting points 160 may be oriented relative to the fan orifice 162, such as about a circumference of the fan orifice 162. The fan orifice 162 may include a shroud 164 configured to couple to the structural support 152 to cover the fan 158 and shield the fan 158 from debris. During operation, the fan motor 156 may rotate the fan 158 to enable the fan 158 to draw and/or force air through the fan orifice 162. As an example, the structural support 152 may be a fan deck of a condenser of the HVAC system, and the fan 158 may direct air across a condenser coil through which refrigerant flows. Thus, the fan 158 may cool the refrigerant in the condenser coil.

In some embodiments, the adjustable mount 150 may be adjustable to change the size of the receptacle or space configured to receive the fan motor 156. By increasing the size of the receptacle, the adjustable mount 150 may receive a fan motor 156 of a larger diameter or width. By reducing the size of the receptacle, the adjustable mount 150 may accommodate a fan motor 156 of a smaller diameter or width. Additionally or alternatively, the adjustable mount 150 may be adjustable to change the position of the fan motor 156 relative to the fan orifice 162. By way of example, each adjustable support 154 may be adjusted to move the fan motor 156 and the fan 158 farther into the fan orifice 162 and closer to the shroud 164. Moreover, each adjustable support 154 may be adjusted to move the fan motor 156 and the fan 158 farther out of the fan orifice 162 and away from the shroud 164. Such movement of the fan motor 156 and the fan 158 may move the fan 158 to a desirable position within the fan orifice 162, such as based on a length 166 or height of the fan motor 156. By changing the size of the receptacle and changing the position of the fan motor 156 relative to the fan orifice 162, the adjustable mount 150 may accommodate differently-sized fan motors 156. In an example, if the fan motor 156 is to be replaced with a new, differently-sized fan motor 156, the same adjustable mount 150 may be used to couple the new fan motor 156 onto the structural support 152.

Additionally, the adjustable mount 150 may be adjustable to couple to mounting points 160 of various orientations. For example, different HVAC systems may have fan orifices 162 of different sizes, such as of different diameters and/or widths. As a result, the mounting points 160 may be positioned differently about the fan orifices 162 in the different HVAC system, and the adjustable supports 154 may be movable relative to one another to align with the mounting points 160. In certain embodiments, the adjustable supports 154 may be moved independently of one another. That is, the adjustable supports 154 may not be coupled to one another, and each adjustable support 154 may be placed at a particular position to align with a respective mounting point 160 of the structural support 152. Thus, the adjustable mount 150 may be configured to accommodate differently-oriented mounting points 160. In this way, the same embodiment of the adjustable mount 150 may be used to couple fan motors 156 to different HVAC systems.

Figure 6:
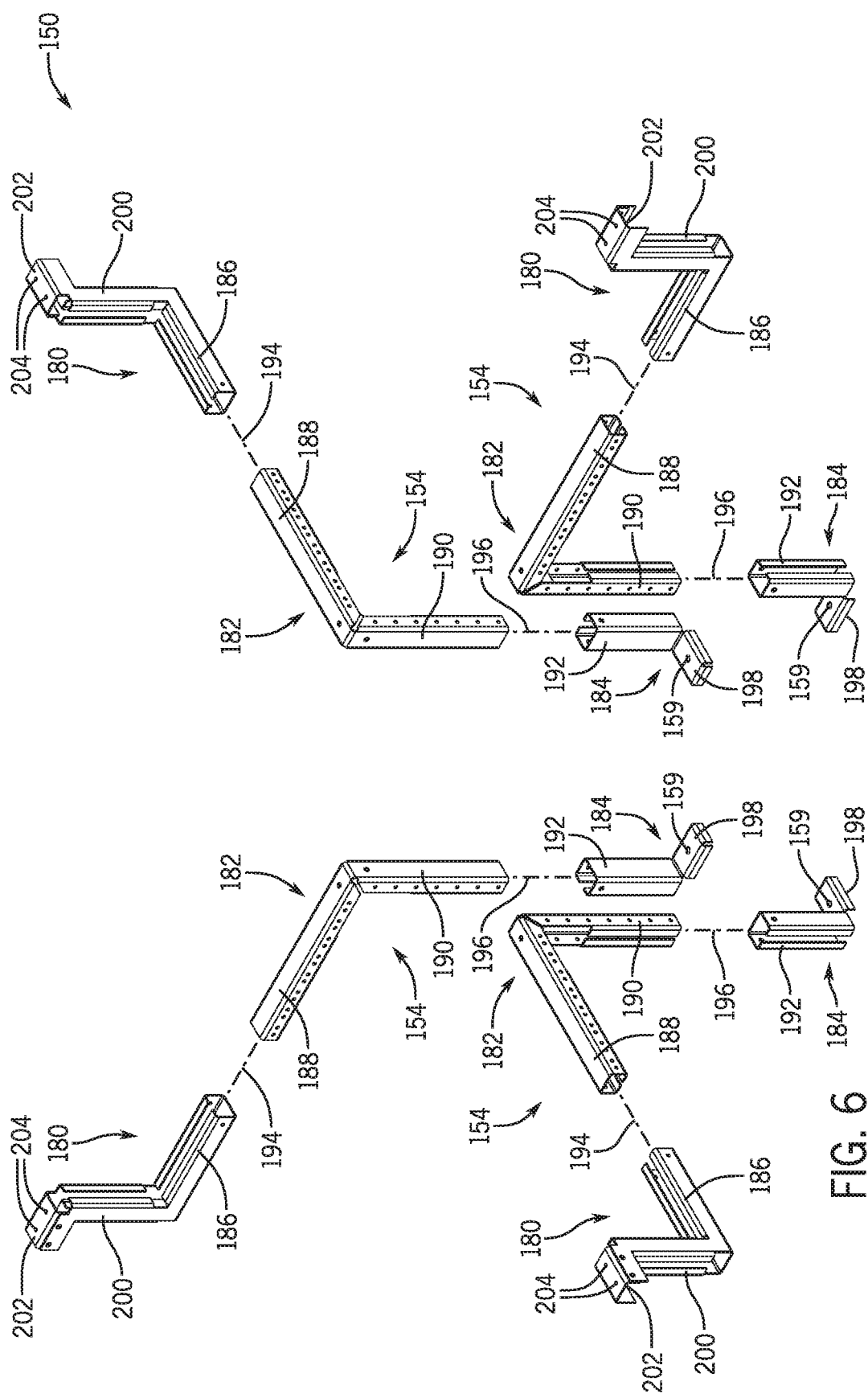
FIG. 6 is an exploded perspective view of an embodiment of an adjustable mount, in accordance with an aspect of the present disclosure.

FIG. 6 is an exploded perspective view of an embodiment of the adjustable mount 150. In the illustrated embodiment, the adjustable mount 150 includes adjustable supports 154 that each include a first frame member 180, a second frame member 182, and a third frame member 184. The first frame member 180 may include a first leg 186 into which a second leg 188 of the second frame member 182 may be inserted. The second frame member 182 may also include a third leg 190 that may be inserted into a fourth leg 192 of the third frame member 184. The frame members 180, 182, 184 may be movable relative to one another. For example, the first leg 186 and the second leg 188 may be adjustably engaged with one another and may be configured to translate or slide relative to one another along a first axis 194 to move the first frame member 180 and the second frame member 182 relative to one another. Additionally, the third leg 190 and the fourth leg 192 may be adjustably engaged with one another and may be configured to translate or slide relative to one another along a second axis 196 that is transverse or crosswise to the first axis 194. Thus, the second frame member 182 and the third frame member 184 are configured to move relative to one another. In certain implementations, the second leg 188 of each second frame member 182 is oriented approximately perpendicularly to the third leg 190 such that the second frame member 182 has an L-shaped body. Thus, the first axis 194 is approximately perpendicular to the second axis 196, and the first frame member 180 and the third frame member 184 may be configured to move along the second leg 188 and the third leg 192, respectively, in directions perpendicular to one another.

Additionally, each third frame member 184 may include a fifth leg 198 that may extend transversely, such as perpendicularly, from the fourth leg 192. The fifth leg 198 may be configured to abut the fan motor 156 in the installed configuration of the adjustable mount 150 to support the fan motor 156, and the fifth leg 198 may include the hole 159 through which a fastener may be inserted to couple the fan motor 156 to the fifth leg 198 and to the third frame member 184. In the installed configuration, the fourth leg 192 may also be configured to abut the fan motor 156 to capture the fan motor 156 and restrict movement of the fan motor 156 within the receptacle defined by the adjustable mount 150. As such, the third leg 190 of the second frame member 182 as well as the fourth leg 192 and the fifth leg 198 of the third frame member 184 may cooperatively form the receptacle configured to receive the fan motor 156 in the installed configuration.

In certain embodiments, the first frame member 180 may also include a sixth leg 200 extending transversely, such as perpendicularly, from the first leg 186 to facilitate coupling of the adjustable mount 150 to the structural support 152. For instance, the sixth leg 200 may offset the first leg 186 from the structural support 152 in the installed configuration of the adjustable mount 150. In this way, the first frame member 180 may have an L-shaped body. In additional or alternative embodiments, the first frame member 180 may include a seventh leg 202 extending transversely, such as perpendicularly, from the sixth leg 200. As such, the seventh leg 202 may extend approximately parallel to the first leg 186 of the first frame member 180 and/or to the second leg 188 of the second frame member 182. In this configuration, the first frame member 180 may have an S-shaped body. The seventh leg 202 may include mounting holes 204. The mounting holes 204 may be configured to align with the mounting points 160 of the structural support 152. For instance, the mounting holes 204 may be configured to receive a respective fastener to couple the seventh leg 202 to the mounting points 160, thereby coupling the first frame member 180 and the adjustable mount 150 to the structural support 152 in the installed configuration.

In the illustrated embodiment, the adjustable supports 154 are generally similar to one another and/or self-similar. That is, each of the adjustable supports 154 includes the first frame member 180, the second frame member 182, and the third frame member 184, and the respective frame members 180, 182, 184 are generally similar to one another. However, it should be noted that in additional or alternative embodiments, the adjustable supports 154 may include a different number of frame members and/or may include frame members that have different shapes or configurations than depicted in FIG. 6. By way of example, each of the legs 186, 188, 190, 192, 198, 200, 202 may be a separate frame member configured to move relative to one another to enable further adjustment of the adjustable mount 150. In any case, the adjustable supports 154 may be adjusted to adjust the size of the receptacle configured to receive the fan motor 156 and may be adjusted to couple to mounting points 160 at a particular position on the structural support 152.

Figure 7:
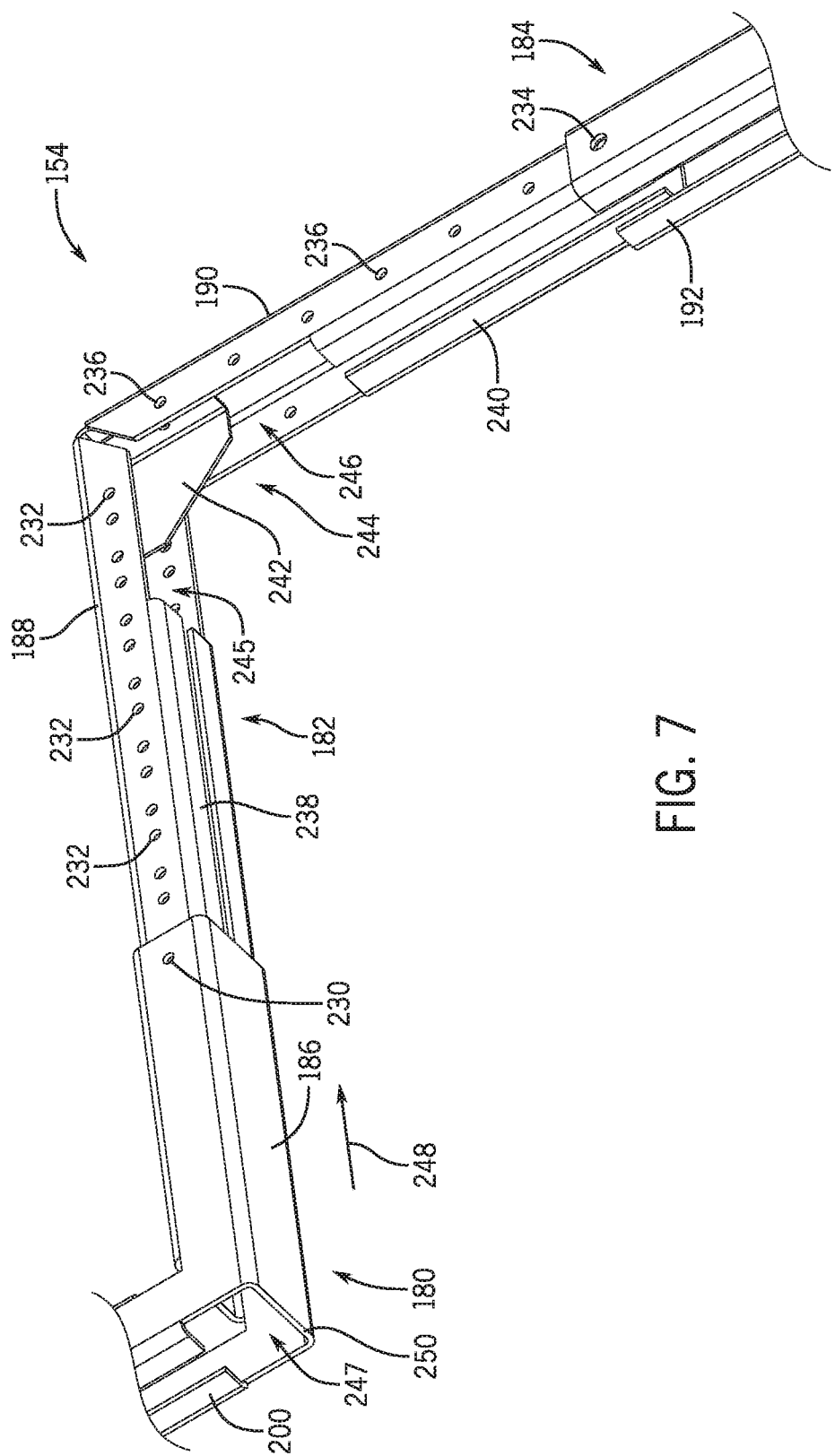
FIG. 7 is an expanded perspective view of an embodiment of an adjustable support of an adjustable mount, in accordance with an aspect of the present disclosure.

FIG. 7 is an expanded perspective view of an embodiment of one of the adjustable supports 154 in which the frame members 180, 182, 184 are coupled to one another. In certain embodiments, the position of the frame members 180, 182, 184 may be set relative to one another via respective openings. In an example, the first frame member 180 may include a first opening 230 or hole formed within the first leg 186. Furthermore, the second frame member 182 may include second openings 232 or holes formed along the second leg 188. To maintain the position of the first frame member 180 relative to the second frame member 182, the first leg 186 may slide along the second leg 188 to align the first opening 230 with one of the second openings 232. A fastener, such as a pin, may then be inserted through the first opening 230 and the second opening 232 to restrict movement between the first leg 186 and the second leg 188, thereby maintaining the position of the first frame member 180 relative to the second frame member 182. Similarly, the third frame member 184 may include a third opening 234 or hole formed through the fourth leg 192, and the second frame member 182 may include fourth openings 236 or holes formed along the third leg 190. To maintain the position of the third frame member 184 relative to the second frame member 182, the fourth leg 192 may slide along the third leg 190 to align the third opening 234 with one of the fourth openings 236. Another fastener may then be inserted through the third opening 234 and the fourth opening 236 to restrict movement between the fourth leg 192 and the third leg 190, thereby maintaining the position of the third frame member 184 relative to the second frame member 182.

In some embodiments, the spacing between each adjacent second opening 232 may be substantially the same, such as between 1.25 centimeters and 3.8 centimeters, or 0.5 inches to 1.5 inches, away from one another. Additionally or alternatively, the respective spacings between adjacent second openings 232 may vary, such as based on possible positions of the mounting points 160 and/or based on possible sizes of the fan motor 156 to be coupled to the adjustable mount 150. Similarly, the spacing between adjacent fourth openings 236 may be substantially the same or may vary based on possible sizes of the fan motor 156.

The second leg 188 of the second frame member 182 may include a first railing 238 or flanges against which the first leg 186 may abut to restrict movement between the first leg 186 of the first frame member 180 and the second leg 188. In other words, the first railing 238 enables the first leg 186 to capture the second leg 188 more securely. Similarly, the third leg 190 of the second frame member 182 may include a second railing 240 or flanges that the fourth leg 192 of the third frame member 184 may capture. Thus, the second railing 240 restricts movement between the third leg 190 and the fourth leg 192. Additionally, the adjustable support 154 may include a bracket 242 or brace configured to couple to the second leg 188 and to the third leg 190. To this end, the bracket 242 may be positioned in a corner 244 of the second frame member 182 where the second leg 188 and the third leg 190 connect with one another. For example, the bracket 242 may be disposed within a first recess 245 of the second leg 188 and a second recess 246 of the third leg 190. The bracket 242 may reinforce and/or add structural rigidity to the second frame member 182 by restricting movement between the second leg 188 and the third leg 190, such as bending of the second frame member 182. Thus, the bracket 242 may enable the adjustable support 154 to support and maintain the position of the fan motor 156 relative to the structural support 152.

In some embodiments, the first leg 186 may include a spacing 247 or opening through which the second leg 188 of the second frame member 182 may extend. As an example, moving the first leg 186 sufficiently in a first translational direction 248 along the second leg 188 may cause the second leg 188 to move toward an edge 250 of the first leg 186. The spacing 247 enables the second leg 188 to extend past the edge 250, thereby enabling the first frame member 180 and the second frame member 182 to move a greater distance relative to one another. In this manner, the adjustable mount 150 may accommodate a greater range of sizes of fan motors 156 and/or of orientations of mounting points 160 on the structural support 152. In additional or alternative embodiments, the third leg 190 may include a similar spacing to enable the third leg 190 to extend past the fourth leg 192, thereby enabling the second frame member 182 and the third frame member 184 to move a greater distance relative to one another.

Figure 8:
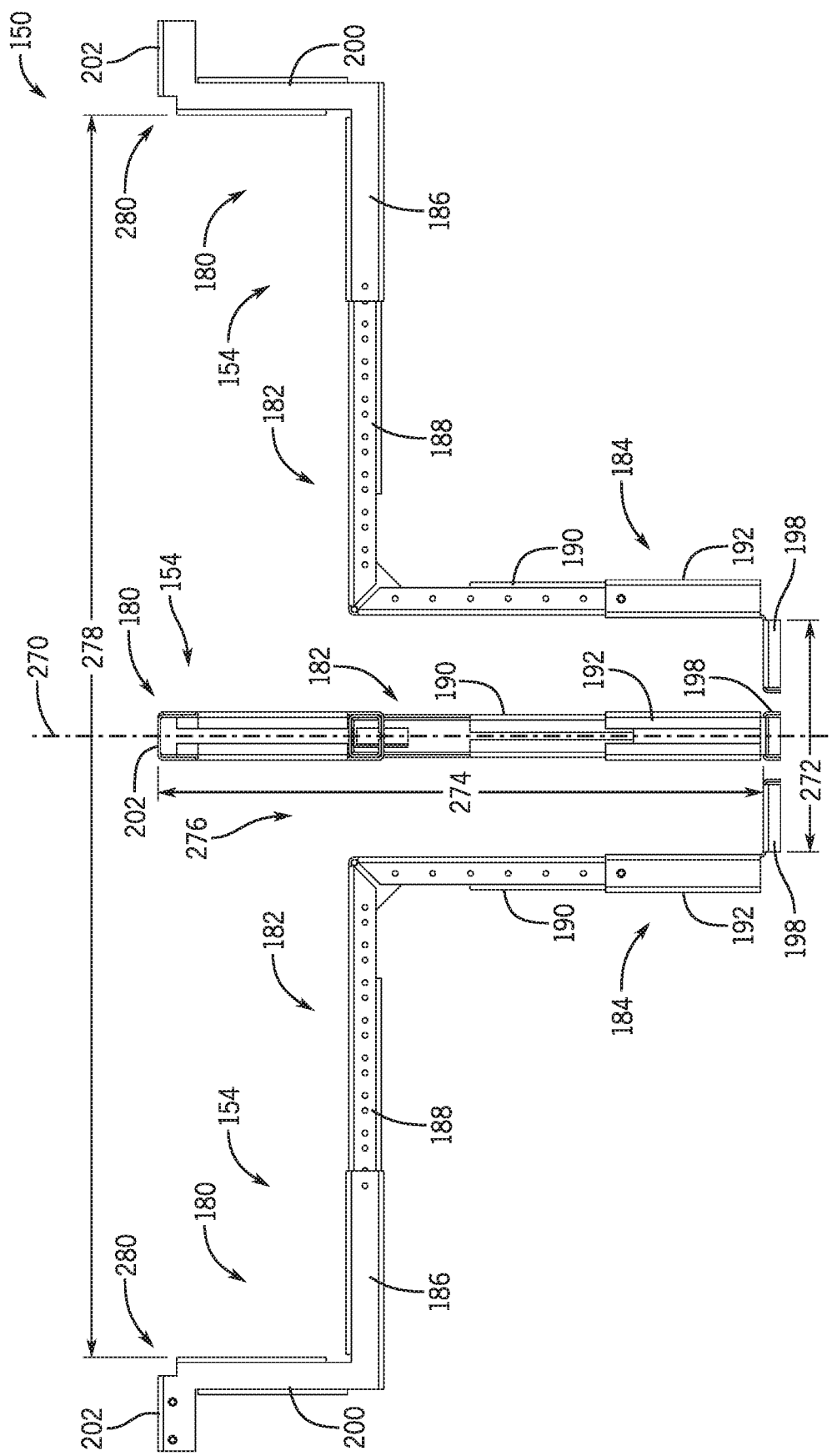
FIG. 8 is a side view of an embodiment of an adjustable mount in a first configuration, in accordance with an aspect of the present disclosure.

FIG. 8 is a side view of an embodiment of the adjustable mount 150 in a first configuration. In the first configuration, each adjustable support 154 may be positioned symmetrically about a center axis 270. That is, each second frame member 182 may be oriented approximately the same relative to one another and relative to the center axis 270. For example, each second frame member 182 may be positioned at the same distance away from center axis 270. Thus, there may be a first distance 272 spanning between fourth legs 192 of third frame members 184 positioned across from one another about the center axis 270. In addition, each of the third frame members 184 may be at substantially the same position along the respective third legs 190. As such, there may be a second distance 274 spanning between the fifth leg 198 of the third frame member 184 and the seventh leg 202 of the first frame member 180. In this manner, the third leg 190, the fourth leg 192, and the fifth leg 198 cooperatively form a first receptacle 276 defined by the first distance 272 and the second distance 274. That is, the size of the first receptacle 276 is based on the first distance 272 and the second distance 274, and the first receptacle 276 may be configured to receive a particularly sized fan motor 156 that may be secured within the first distance 272 and positioned as desired relative to the structural support 152 based on the second distance 274.

Moreover, each of the second frame members 182 may be at substantially the same position along the respective second legs 188. As such, there may be a third distance 278 spanning between the sixth legs 200 of the first frame members 180 positioned across from one another about the center axis 270. Thus, the second frame members 182 may be configured to align with and couple to mounting points 160 based on the third distance 278.

In certain embodiments, the seventh leg 202 of each first frame member 180 may include a recess or chamfer 280. The recess 280 may provide some clearance or tolerance to facilitate positioning of the first frame member 180 onto the structural support 152. As an example, the fan orifice 162 may include a lip or flange, and the first frame member 180 may be coupled to the mounting point 160 to abut the lip within the recess 280, thereby restricting movement between the first frame member 180 and the structural support 152 to secure the first frame member 180 onto the structural support 152.

Figure 9:
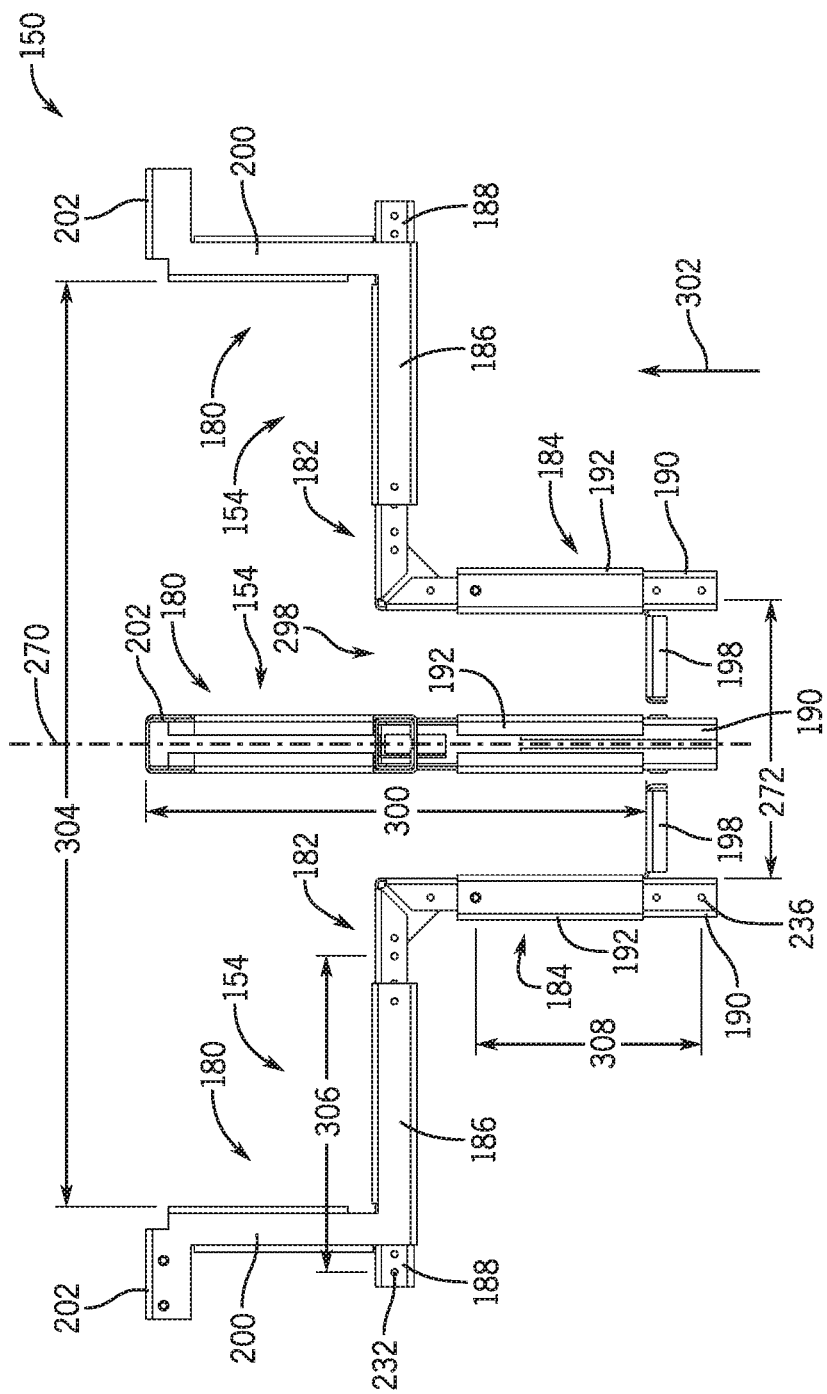
FIG. 9 is a side view of the adjustable mount of FIG. 8 in a second configuration, in accordance with an aspect of the present disclosure.

FIG. 9 is a side view of the adjustable mount 150 of FIG. 8 in a second configuration. Each adjustable support 154 may also be positioned symmetrically about the center axis 270 in the second configuration. Moreover, the fourth legs 192 of the third frame members 184 may remain positioned away from one another at the first distance 272 in the second configuration. In this way, a second receptacle 298 formed by the adjustable supports 154 may be configured to receive another fan motor 156 having a substantially similar diameter or width as the fan motor 156 to be received by the first receptacle 276 in the first configuration of the adjustable mount 150 shown in FIG. 8. However, in the second configuration, the third frame members 184 may be moved along the third legs 190 of the second frame members 182 to reduce the distance between the fifth legs 198 of the third frame members 184 and the seventh legs 202 of the first frame members 180 from the second distance 274 to a fourth distance 300. By way of example, each third frame member 184 may slide in a second translational direction 302, such as a vertically upward direction, relative to the second frame members 182. As such, the fan motor 156 may be moved toward the structural support 152. Thus, the second receptacle 298 may accommodate or engage with fan motors 156 of a shorter length or height.

In addition, the first frame members 180 may slide along the second legs 188 of the second frame members 182 to reduce the distance between the sixth legs 200 of the first frame members 180 from the third distance 278 to a fifth distance 304. For instance, the first frame members 180 may be moved toward the center axis 270 and toward one another. Thus, the seventh legs 202 of the first frame members 180 may align with mounting points 160 positioned closer to one another, such as around another fan orifice 162 configured to receive fans 158 of a smaller diameter. In any case, the first frame member 180, the second frame member 182, and the third frame member 184 of each adjustable support 154 may be independently adjustable relative to one another to increase or reduce the size of the receptacle.

It should be noted that additionally or alternatively, the adjustable mount 150 may be adjusted to engage with differently-sized fan motors 156. By way of example, the second frame members 182 may slide along the first legs 186 of the first frame members 180 to change the distance between the fourth legs 192 of the third frame members 184.

Moving the second frame members 182 toward the center axis 270 and toward one another may reduce the distance between the fourth legs 192, and moving the second frame members 182 away from the center axis 270 and away from one another may increase the distance between the fourth legs 192. Thus, the second frame members 182 may be positioned relative to one another to form a particularly-sized receptacle configured to engage with a fan motor 156 having a certain diameter or width.

In certain implementations, each first frame member 180 may be adjustable along the second leg 188 within a first range 306, which is the distance between the second opening 232 that is most proximate to the third leg 190 and the second opening 232 that is most distal to the third leg 190. Thus, each position to which the first frame member 180 may be set is within the first range 306. By way of example, the first range 306 may be a distance between 10 centimeters and 25 centimeters, or between 4 inches and 10 inches, along the second leg 188. Similarly, each third frame member 184 may be adjustable along the third leg 190 within a second range 308, which is the distance between the fourth opening 236 that is most proximate to the second leg 188 and the fourth opening 236 that is most distal to the second leg 188. Although the third leg 190 is shorter than the second leg 188 in the illustrated embodiment, in additional or alternative embodiments, the second leg 188 may have substantially the same length as the third leg 190. For instance, the second range 308 may be another distance between 10 centimeters and 25 centimeters, or between 4 inches and 10 inches, along the third leg 190.

It should also be noted that in alternative embodiments, the respective legs of the adjustable supports 154 may be structured differently than described herein to enable adjustability of each adjustable support 154. For instance, the first legs 186 of the first frame members 180 may extend into the respective second legs 188 of the second frame members 182. Additionally or alternatively, the fourth leg 192 of the third frame members 184 may alternatively extend into the respective third legs 190 of the second frame members 182.

Figure 10:
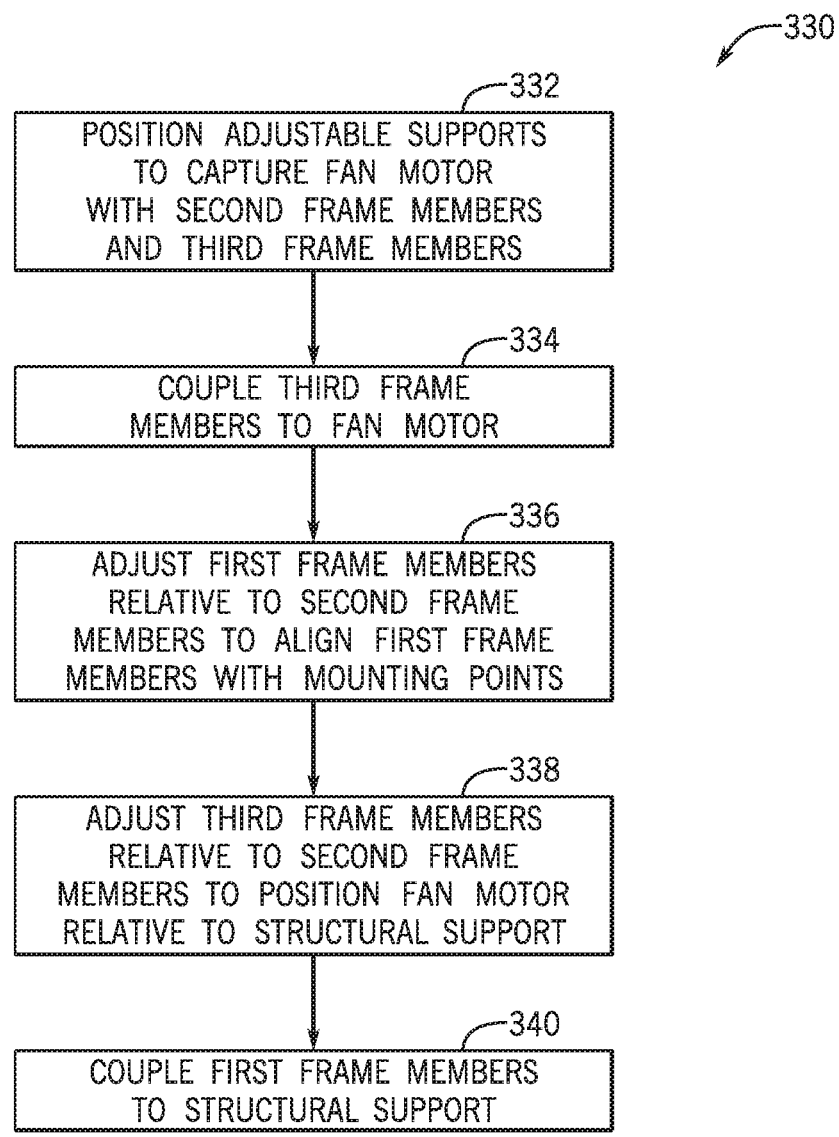
FIG. 10 is a block diagram of a method or process for coupling an adjustable mount to a structural support of an HVAC system, in accordance with an aspect of the present disclosure.

FIG. 10 is a block diagram of a method or process 330 for coupling the adjustable mount 150, the fan motor 156, and the fan 158 to the structural support 152. As an example, the method 330 may be performed by a manufacturer and/or a technician of the HVAC system having the structural support 152. It should be noted that the method 330 may be performed differently than depicted in FIG. 10, such as for different embodiments of the adjustable mount 150. For instance, further steps may be performed in addition to the steps of the method 330, and/or certain steps of the depicted method 330 may be removed, modified, or performed in a different order.

At block 332, the adjustable supports 154 are positioned to capture the fan assembly 155 having the fan motor 156 and the fan 158. For example, the adjustable supports 154 are positioned to surround the circumference or perimeter of the fan motor 156, such that the fourth legs 192 of the third frame members 184 and/or the third legs 190 of the second frame members 182 abut the fan motor 156. In this way, the adjustable supports 154 form the receptacle that captures the fan motor 156. Furthermore, the fifth legs 198 of the third frame members 184 may abut the fan motor 156.

The third frame members 184 are then coupled to the fan motor 156, as indicated at block 334. In some embodiments, the holes 159 of the third frame members 184 may align with corresponding holes of the fan motor 156. As such, fasteners may be inserted through the holes 159 to couple the fan motor 156 onto the fifth legs 198 of the third frame members 184 with the fan motor 156. Additionally or alternatively, the fan motor 156 may be coupled to the adjustable supports 154 in other manners, such as via adhesives, an interference fit, clamps, or other features. In any case, the fan motor 156 is secured within the receptacle, and movement between the fan motor 156 and the adjustable supports 154 is restricted.

At block 336, the first frame members 180 are adjusted relative to the second frame members 182 to align the first frame members 180 with the mounting points 160 of the structural support 152. For instance, the first legs 186 of the first frame members 180 may slide along the respective second legs 188 of the second frame members 182, while the positions of the second frame members 182 are maintained relative to one another to capture the fan motor 156. When the position of the first frame members 180 are desirable and the first frame members 180 align with respective mounting points 160, the position of the first frame members 180 may be maintained. As an example, the first opening 230 of the first frame member 180 may be aligned with one of the second openings 232 of the second frame member 182, and a fastener may be inserted through the first opening 230 and the second opening 232. Thus, the fastener may restrict movement between the first leg 186 and the second leg 188, thereby maintaining the position of the first frame member 180 relative to the second frame member 182.

At block 338, the third frame members 184 are adjusted relative to the second frame members 182 to place the fan motor 156 and the fan 158 in a desirable position relative to the structural support 152. By way of example, the fourth legs 192 of the third frame members 184 may slide along the respective third legs 190 of the second frame members 182. When the positions of the third frame members 184 are desirable to position the fan 158 in a particular position relative to the fan orifice 162, the position of the third frame members 184 may be maintained. In some implementations, the third opening 234 of the third frame member 184 may be aligned with one of the fourth openings 236 of the second frame member 182, and a fastener may be inserted through the third opening 234 and the fourth opening 236. As such, the fastener may restrict movement between the third leg 190 and the fourth leg 192, thereby maintaining the position of the third frame member 184 relative to the second frame member 182.

At block 340, the first frame members 180 are coupled to the structural support 152. For example, fasteners may be inserted through the seventh legs 202 of the first frame members 180 and through the mounting points 160. Thus, the fasteners restrict movement between the first frame members 180 and the structural support 152 to secure the adjustable mount 150 to the structural support 152. Additionally or alternatively, other mechanisms may be used to couple the first frame members 180 and the structural support 152 together, including an adhesive, a weld, an interference fit, another suitable mechanism, or any combination thereof. In any case, coupling the first frame members 180 to the structural support 152 secures the adjustable mount 150, the fan motor 156, and the fan 158 to the structural support 152.

It should be noted that a method that is generally opposite the method 330 may be used to decouple the adjustable mount 150, the fan motor 156, and the fan 158 from the structural support 152. That is, the first frame members 180 may be decoupled from the structural support 152, the third frame members 184 may be decoupled from the fan motor 156, and the fan motor 156 may be removed from the receptacle formed by the adjustable supports 154. In this way, the fan motor 156 and the fan 158 may be easily removed from the structural support 152, such as for maintenance and/or replacement, without having to modify other components of the HVAC system.

The present disclosure may provide one or more technical effects useful in the operation of an HVAC system. The HVAC system may use a fan to cool a component of the HVAC system. The fan may be coupled to a respective fan motor configured to rotate the fan. The fan motor may be secured to the HVAC system, such as to a structural support, via a motor mount. The motor mount may include mounting legs that form a receptacle configured to receive the fan motor. Each mounting leg may include a first frame member, a second frame member, and a third frame member. Each first frame member may be configured to couple to a mounting point of the structural support. Furthermore, each second frame member may be adjustably coupled to one of the first frame members. As an example, the second frame member may translate relative to the first frame member along a first axis to change a size of the receptacle, and the first frame member may translate relative to the second frame member along the first axis to adjust the alignment between the first frame member and the mounting point. In addition, each third frame member may be adjustably coupled to one of the second frame members. The third frame member may translate relative to the second frame member along a second axis transverse to the first axis to change a position of the fan motor relative to the structural support, so as to position a fan coupled to the fan motor within a fan orifice of the structural support. Thus, the motor mount may be configured to couple to different HVAC systems that may have differently-positioned mounting points. Furthermore, the motor mount may be adjustable to accommodate fan motors of different sizes. Thus, the motor mount may enable different HVAC systems having differently-oriented mounting points to utilize differently-sized motors without having to manufacture different embodiments or configurations of motor mounts. In this way, the motor mount may reduce a cost associated with installing different fan motors in different HVAC systems. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be noted that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An adjustable mount for a fan assembly, comprising:
   a plurality of adjustable supports configured to mount the fan assembly to a heating, ventilation, and/or air conditioning (HVAC) unit, wherein each adjustable support of the plurality of adjustable supports includes a first frame member, a second frame member, and a third frame member, wherein the first and second frame members are adjustable relative to one another along a first axis, and the second and third frame members are adjustable relative to one another along a second axis crosswise to the first axis.

2. The adjustable mount of claim 1, wherein the first frame member is configured to slide relative to the second frame member to adjust for engagement with mounting points positioned in different orientations on the HVAC unit.

3. The adjustable mount of claim 1, wherein the second frame member is configured to slide relative to the first frame member to adjust for engagement with different motor diameters.

4. The adjustable mount of claim 1, wherein the third frame member is configured to slide relative to the second frame member to adjust for engagement with different motor lengths.

5. The adjustable mount of claim 1, wherein the plurality of adjustable supports is symmetrically disposed about a central axis to form a receptacle for the fan assembly.

6. The adjustable mount of claim 1, wherein the first frame member has an L-shaped body including a first leg and a second leg extending transverse to the first leg, and the second leg is adjustably engaged with the second frame member.

7. The adjustable mount of claim 6, wherein the second frame member has an L-shaped body including a third leg and a fourth leg extending transverse to the third leg, and the second leg of the first frame member is slidably engaged with the third leg of the second frame member.

8. The adjustable mount of claim 1, wherein the first frame member has an S-shaped body including a first leg, a second leg extending transverse to the first leg, and a third leg extending transverse to the second leg, and the third leg is adjustably engaged with the second frame member.

9. The adjustable mount of claim 8, wherein the first leg is perpendicular to the second leg.

10. The adjustable mount of claim 1, wherein the plurality of adjustable supports includes four adjustable supports.

11. The adjustable mount of claim 1, wherein the plurality of adjustable supports are not coupled to one another in an installed configuration of the adjustable mount.

12. An adjustable mount for a fan assembly, comprising:
   a plurality of first frame members disposed about a center axis;
   a plurality of second frame members, wherein each second frame member of the plurality of second frame members is adjustably coupled to a respective first frame member of the plurality of first frame members, and the plurality of first frame members and the plurality of second frame members respectively coupled together are adjustable relative to one another along a respective first axis; and
   a plurality of third frame members, wherein each third frame member of the plurality of third frame members is adjustably coupled to a respective second frame member of the plurality of second frame members, and the plurality of second frame members and the plurality of third frame members respectively coupled together are adjustable relative to one another along a second axis crosswise to each first axis.

13. The adjustable mount of claim 12, wherein each first frame member of the plurality of first frame members is configured to couple to a heating, ventilation, and/or air conditioning (HVAC) unit.

14. The adjustable mount of claim 12, wherein the plurality of second frame members and the plurality of third frame members cooperatively define a receptacle configured to receive a fan motor.

15. The adjustable mount of claim 14, wherein each third frame member of the plurality of third frame members includes a first leg and a second leg extending transverse to the first leg, and the first legs and the second legs are configured to abut the fan motor in an installed configuration of the adjustable mount.

16. The adjustable mount of claim 15, wherein the second leg of each third frame member of the plurality of third frame members includes a hole configured to receive a fastener to couple the fan motor to the second leg.

17. The adjustable mount of claim 12, wherein each second frame member of the plurality of second frame members includes a first leg and a second leg extending transverse to the first leg, each first leg is configured to adjustably couple to a respective first frame member of the plurality of first frame members, and each second leg is configured to adjustably couple to a respective third frame member of the plurality of third frame members.

18. The adjustable mount of claim 17, wherein each second frame member of the plurality of second frame members includes a brace abutting the first leg and the second leg.

19. The adjustable mount of claim 17, wherein each first leg has a plurality of first openings, each first frame member of the plurality of first frame members has a second opening, the plurality of first frame members and the plurality of second frame members are configured to move relative to one another to align the second opening with a selected first opening of the plurality of first openings, and the selected first opening and the second opening are configured to receive a fastener to maintain a respective position of each second frame member of the plurality of second frame members relative to the respective first frame member of the plurality of first frame members.

20. The adjustable mount of claim 17, wherein each second leg has a plurality of first openings, each third frame member of the plurality of third frame members has a second opening, the plurality of second frame members and the plurality of third frame members are configured to move relative to one another to align the second opening with a selected first opening of the plurality of first openings, and the selected first opening and the second opening are configured to receive a fastener to maintain a respective position of each third frame member of the plurality of third frame members relative to the respective second frame member of the plurality of second frame members.

21. A heating, ventilation, and/or air conditioning (HVAC) system, comprising:
a structural support having a fan orifice; and
a plurality of mounting legs positioned about a central axis of the fan orifice to form a receptacle configured to receive a fan motor therein, wherein each mounting leg of the plurality of mounting legs includes a first frame member configured to couple to the structural support, a second frame member coupled to the first frame member, and a third frame member coupled to the second frame member, the first frame member and the second frame member are configured to translate relative to one another along a respective first axis, and the second frame member and the third frame member are configured to translate relative to one another along a second axis crosswise to each first axis.

22. The HVAC system of claim 21, wherein the structural support has a plurality of mounting points positioned about the fan orifice, and each mounting leg of the plurality of mounting legs is positioned to align each first frame member with a respective mounting point of the plurality of mounting points.

23. The HVAC system of claim 22, wherein the second frame member and the third frame member are configured to change a position of the fan motor relative to the fan orifice by translating relative to one another along the second axis.

24. The HVAC system of claim 21, wherein a size of the receptacle is adjustable via translation of the second frame member relative to the first frame member along the respective first axis and translation of the third frame member relative to the second frame member along the second axis.

25. The HVAC system of claim 21, wherein each first frame member, second frame member, and third frame member of the plurality of mounting legs are independently movable relative to one another.

26. An adjustable mount for an HVAC fan assembly, comprising:
a plurality of adjustable supports configured to suspend the HVAC fan assembly from a structural support, wherein each adjustable support includes three frame members and is adjustable in two mechanical degrees of freedom.

27. The adjustable mount of claim 26, wherein a first frame member and a second frame member of each adjustable support are adjustable relative to one another to adjust a first mechanical degree of freedom of the adjustable support.

28. The adjustable mount of claim 27, wherein the second frame member and a third frame member of each adjustable support are adjustable relative to one another to adjust a second mechanical degree of freedom of the adjustable support.

29. The adjustable mount of claim 28, wherein the first mechanical degree of freedom extends along a first axis, the second mechanical degree of freedom extends along a second axis, and the first and second axes are perpendicular to one another.

30. The adjustable mount of claim 26, wherein the structural support is a fan deck of an HVAC unit, a first frame member of each adjustable support is configured to mount to the fan deck, and a second frame member of each adjustable support is configured to mount to a fan motor of the HVAC fan assembly.

* * * * *